US012655611B2

(12) United States Patent
Nistler

(10) Patent No.: US 12,655,611 B2
(45) Date of Patent: Jun. 16, 2026

(54) CONNECTED SERVICES MODULE FOR A WORK VEHICLE

(71) Applicant: CNH Industrial America LLC, New Holland, PA (US)

(72) Inventor: Jonathan Richard Nistler, Moorhead, MN (US)

(73) Assignee: CNH Industrial America LLC, New Holland, PA (US)

( * ) Notice: Subject to any disclaimer, the term of this patent is extended or adjusted under 35 U.S.C. 154(b) by 175 days.

(21) Appl. No.: 18/539,912

(22) Filed: Dec. 14, 2023

(65) Prior Publication Data

US 2025/0198124 A1 Jun. 19, 2025

(51) Int. Cl.
*E02F 9/26* (2006.01)
*G07C 5/00* (2006.01)
*G07C 5/02* (2006.01)
*G07C 5/08* (2006.01)

(52) U.S. Cl.
CPC . *E02F 9/26* (2013.01); *G07C 5/02* (2013.01)

(58) Field of Classification Search
CPC .. E02F 9/26; G07C 5/02; G07C 5/008; G07C 5/0808; G07C 5/085
USPC ........................................................ 701/33.4
See application file for complete search history.

(56) References Cited

U.S. PATENT DOCUMENTS

2005/0137786 A1* 6/2005 Breed ............. B60W 30/18159 701/482
2013/0030873 A1* 1/2013 Davidson ............. G07C 5/0808 705/7.36
2014/0214253 A1* 7/2014 Inoue ...................... B60L 58/15 701/22
2014/0324279 A1* 10/2014 Shinohara .......... G05B 23/0216 701/31.5
2016/0071417 A1* 3/2016 Lewis .................... G08G 1/162 701/301
2020/0348137 A1 11/2020 Jain et al.
2021/0107470 A1* 4/2021 Oboril ................... B60W 40/06
2025/0198124 A1* 6/2025 Nistler ...................... E02F 9/26

FOREIGN PATENT DOCUMENTS

CN 203472674 U 3/2014
GB 2483459 A 3/2012

OTHER PUBLICATIONS

Geotab Inc., Geotab GO vehicle tracking device, pp. 1-14, https://www.geotab.com/vehicle-tracking-device/, last visited Dec. 13, 2023.

* cited by examiner

*Primary Examiner* — Tyler D Paige
(74) *Attorney, Agent, or Firm* — Fletcher Yoder, P.C.

(57) ABSTRACT

Present embodiments disclose a connected services module that removably couples to a work vehicle. The connected services module includes a voltage sensor configured to output a voltage signal indicative of a voltage output of an electrical system of the work vehicle and a controller communicatively coupled to the voltage sensor. The controller includes a processer and a memory, and the controller is configured to receive the voltage signal from the voltage sensor, determine whether the work vehicle is operating in a first or second mode of operation based on the voltage output, determine a run time corresponding to a duration the work vehicle is operating in the second mode of operation, and output a run time signal indicative of the run time of the work vehicle.

20 Claims, 3 Drawing Sheets

CONNECTED SERVICES MODULE FOR A WORK VEHICLE

BACKGROUND OF THE INVENTION

The present disclosure relates generally to a connected services module for a work vehicle.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A work vehicle may be produced from a variety of manufacturers to facilitate completion of tasks in a variety of industries, including but not limited to agriculture, construction, mining, and heavy commercial applications. Frequently, these work vehicles are manufactured to include pre-installed telemetry solutions and accompanying software that allow operators to track a multitude of parameters while the work vehicles are in operation. Information from these telemetry systems aid operators in tracking how long a particular work vehicle has been running, and helps the same operators generate maintenance schedules to ensure their respective fleet of work vehicles continue to operate smoothly.

However, in many cases, due to the aforementioned diversity of manufacturers of work vehicles, an operator may manage a fleet of work vehicles that have different brands of telemetry solutions pre-installed. These different brands of telemetry solutions may not communicate with each other using the same software, and different brands may offer different features and capabilities that are not universal to all systems. As a result, the operator may perform manual checking and reporting, or the operator may log in to several different fleet monitoring telemetry solution systems to repeat the same action or command.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a connected services module includes a voltage sensor configured to output a voltage signal indicative of a voltage output of an electrical system of a work vehicle and a controller communicatively coupled to the voltage sensor. The controller includes a processor and a memory, and the controller is configured to receive the voltage signal from the voltage sensor and determine whether the work vehicle is operating in a first mode of operation or a second mode of operation based on the voltage output. Additionally, the controller is configured to determine a run time corresponding to a duration that the work vehicle is operating in the second mode of operation and output a run time signal indicative of the run time of the work vehicle. Furthermore, the connected services module is configured to removably couple to the work vehicle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
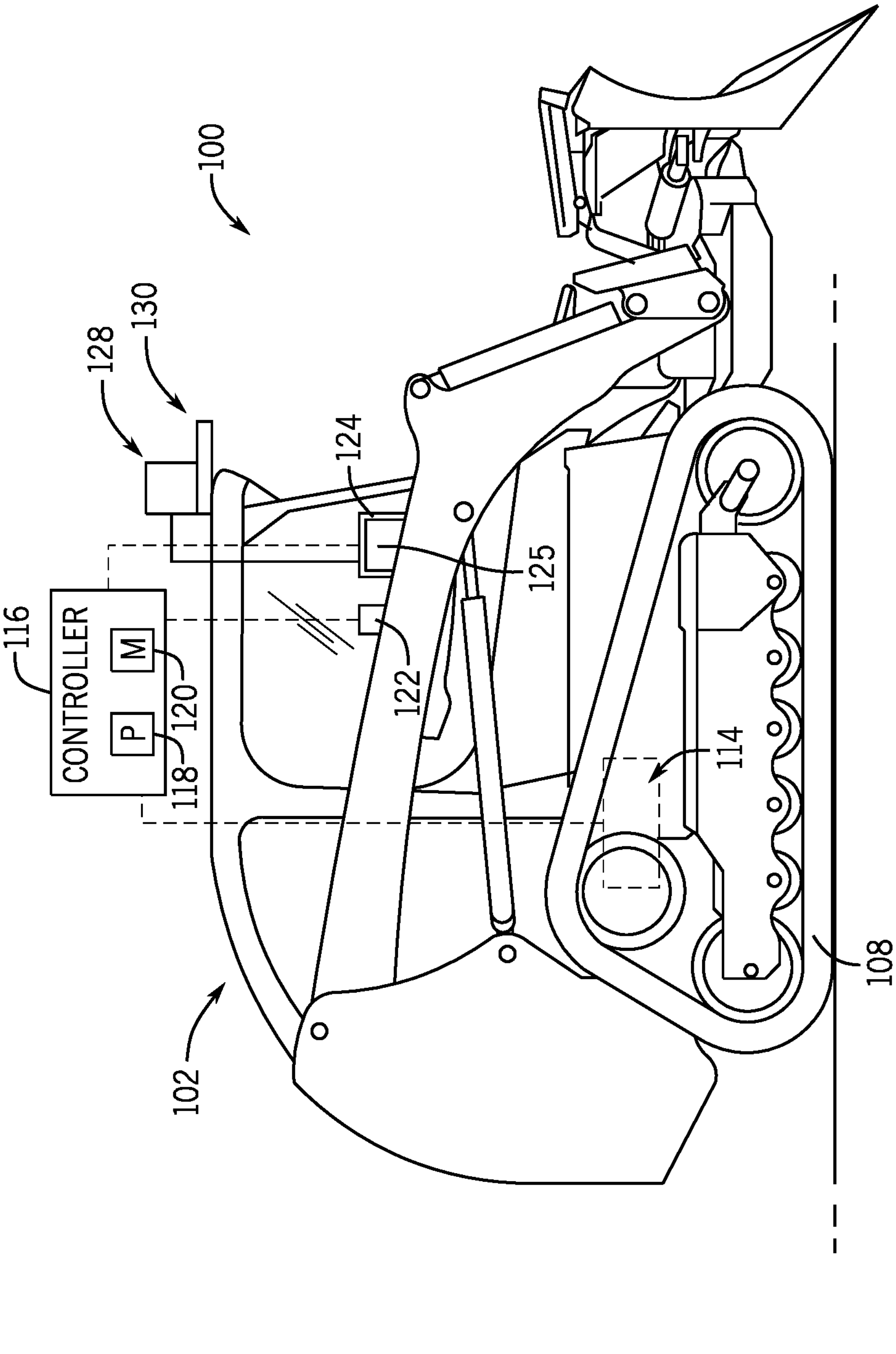
FIG. 1 is a side view of an embodiment of a work vehicle employing an embodiment of a connected services module, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Work vehicles are utilized by operators in a variety of industries, including but not limited to agriculture, construction, mining, and heavy commercial applications. These demanding industries utilize these work vehicles to complete a large array of tasks, and often a single work vehicle does not have the capability to complete each task. As a result, many industries utilize a large fleet of work vehicles, with each fleet including many different types of work vehicles. In many cases, a single work vehicle is configured to complete a single task, of the many tasks performed on a job site, leading to use of a variety of different work vehicles. Work vehicles configured to perform the variety of tasks in the various industries are made by several different manufacturers.

As work vehicle fleets become more expansive and diversified, maintenance and upkeep of these vehicles becomes increasingly difficult. Many work vehicles include pre-installed telemetry system software to track key operating parameters as the work vehicles complete tasks. However, due to the variety of manufacturers that make these work vehicles, a single work vehicle fleet may contain work vehicles manufactured by several different entities, each with their own respective telemetry system software. Without a system that can track work vehicle operation parameters universally, the work vehicle fleet managers and operators may manually check and report on work vehicle run time and operation hours.

The connected service module disclosed herein may enable work vehicle fleet managers to track the hours of operation, or run time, for work vehicles in their respective fleets. Some solutions currently available include third-party systems that can accommodate multiple brands, but as a tradeoff, these third-party systems sacrifice crucial features that are present in the pre-installed software that comes from the original equipment manufacturer (OEM). These currently available solutions may also necessitate a connection to a work vehicle's controller area network (CAN) bus. The connected service module disclosed herein includes a voltage sensor configured to communicate a voltage output from the electrical system of the work vehicle to a controller. Using the voltage output, the controller may determine a run time of the work vehicle, regardless of the manufacturer, without requiring a connection to the work vehicle CAN bus.

Turning now to the drawings, FIG. 1 is a side view of an embodiment of a work vehicle 100 employing an embodiment of a connected services module. In the illustrated embodiment, the work vehicle is a skid steer, but any work vehicle performing tasks in an industry is envisioned, including but not limited to tractors, harvesters, cotton pickers, excavators, bulldozers, compactors, forklifts, work trucks, service trucks, fuel tenders, buses, and people movers. In the illustrated embodiment, the work vehicle 100 has a frame 102 that provides a rigid structure configured to support the components and sub-components of the work vehicle. For example, in the illustrated embodiment, a motion component 108 enables the work vehicle 100 to move around a job site, and may include a set of wheels and tires and/or a set of tracks. Additionally, an engine 114 is situated in the frame 102 of the work vehicle 100, and the engine 114 outputs mechanical power to actuate the motion component 108 to move the work vehicle 100 around the job site.

In the illustrated embodiment, a vehicle controller 116 is included in the work vehicle 100. The vehicle controller 116 includes a processor 118 and a memory 120 configured to provide instructions to various components of the work vehicle 100. In the illustrated embodiment, the vehicle controller 116 communicatively couples to the engine 114. In the illustrated embodiment, the vehicle controller 116 communicatively couples to one or more input devices 122 (e.g. lever, pedal, knob, switch, joystick) and a CAN bus 125. Furthermore, in a non-limiting embodiment, the vehicle controller 116 outputs data/signal(s) to the engine 114, receives data/signal(s) from the input device(s), and outputs data/signal(s) to and receives data/signal(s) from the CAN bus 125. Additionally, the vehicle electrical system 124 provides electrical power to the vehicle controller 116 while also providing electrical power to other components of the work vehicle, including but not limited to the headlights, taillights, user interface etc.

In a non-limiting embodiment, a connected services module 128 is coupled to the work vehicle 100 (e.g., to the work vehicle frame 102) through a mechanical connection interface 130. The mechanical connection interface 130 may include but is not limited to an adhesive interface, a magnetic interface, a fastener interface, other suitable mechanical connection(s), or a combination thereof. In the illustrated embodiment, the connected services module 128 is disposed on top of the frame 102 of the work vehicle 100, but the connected services module 128 may also be disposed in the interior of the cabin of the work vehicle, on the side of the frame, or any other suitable location that provides a convenient connection location. In a non-limiting embodiment, the connected services module 128 is electrically connected to the vehicle electrical system 124 and is configured to monitor an output voltage of the vehicle electrical system 124.

Figure 2:
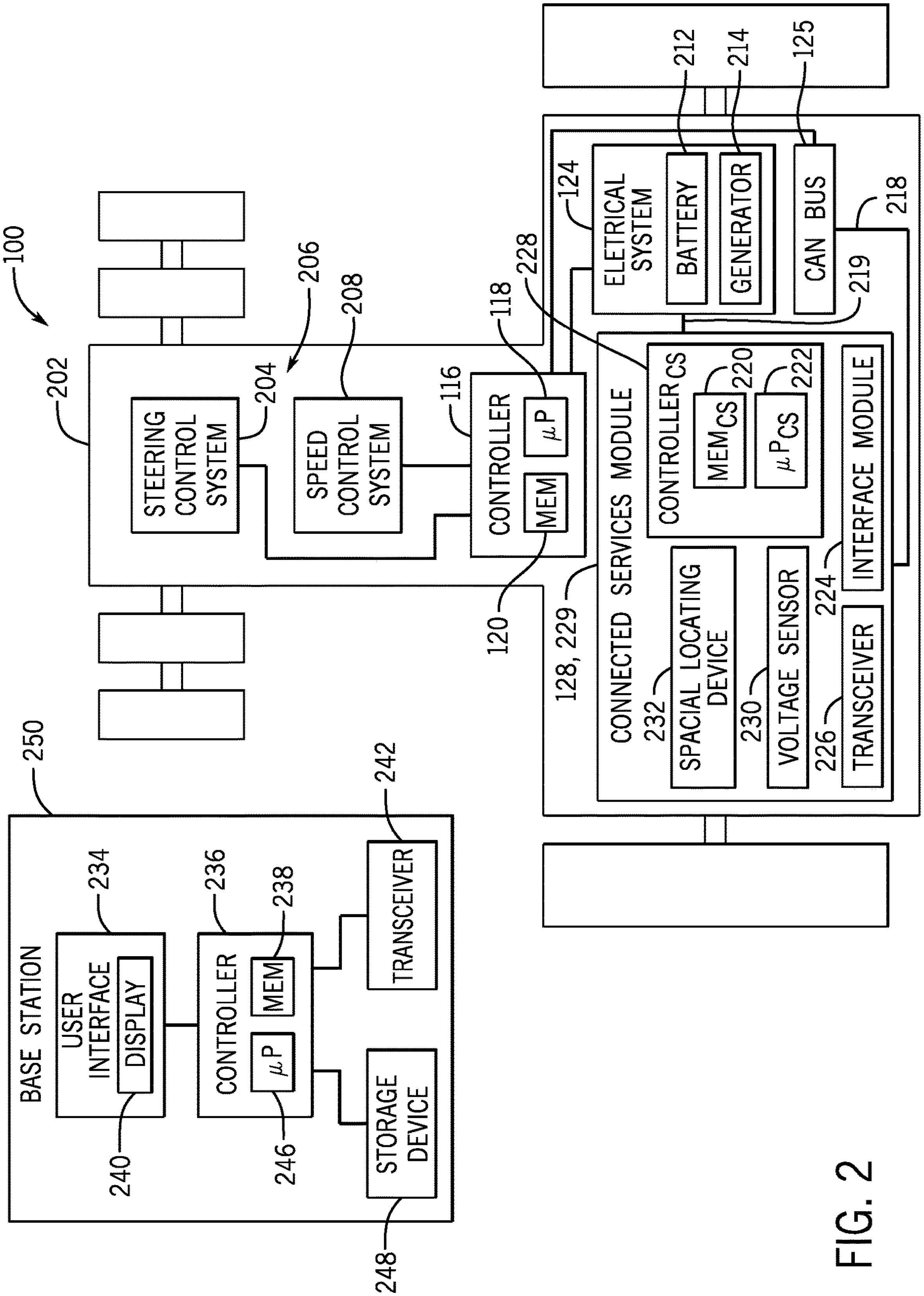
FIG. 2 is a schematic view of the work vehicle employing the connected services module of FIG. 1, in accordance with aspects of the present disclosure.

FIG. 2 is a schematic view of the work vehicle 100 employing the connected services module of FIG. 1. The work vehicle 100 includes a work vehicle control system 202 that includes a movement control system 206 having a steering control system 204 and a speed control system 208. The steering control system 204 is configured to control a direction of movement of the work vehicle 100, and the speed control system 208 is configured to control a speed of the work vehicle 100. In a non-limiting embodiment, the work vehicle control system 202 includes the controller 116 which is communicatively coupled to the steering control system 204 and the speed control system 208. The controller 116 may be configured to control the work vehicle 100 during certain phases of work operations carried out by the work vehicle 100. Additionally, via the aforementioned input device(s) 122 from FIG. 1, an operator may directly control the steering control system 204 to control the direction of the movement of the work vehicle and the operator may directly control the speed control system 208 via an input device 122 to control the speed of the work vehicle 100.

The work vehicle 100 includes the vehicle electrical system 124. The vehicle electrical system 124 is configured to provide electrical power to various components and control systems of the work vehicle 100. The vehicle electrical system 124 includes one or more batteries 212 configured to provide a voltage output (e.g., to start the engine, to power the controller, etc.), and one or more generators 214 configured to charge the one or more batteries 212 while the engine is running. In a non-limiting embodiment, the vehicle electrical system 124 is electrically coupled to the controller 116, and the controller is an electronic controller having electrical circuitry powered by the vehicle electrical system 124.

In a non-limiting embodiment, the work vehicle 100 additionally includes a controller area network (CAN) bus 125 configured to log and communicate telemetry data of the work vehicle 100. The CAN bus 125 functions as a connection network for the work vehicle 100 and further enables communication between various components in the work vehicle 100. The CAN bus 125 provides an access point to access data regarding current and past work vehicle operations. For example, the CAN bus 125 may communicate information including but not limited to oil temperature and pressure, coolant level, engine speed, fuel flow rate, battery current, engine torque, fault codes, fuel level, mileage, engine hours, vehicle speed, and status of various sensors on the work vehicle. In certain embodiments, the work vehicle controller 116 includes software configured to access and output the information gathered from the CAN bus 125.

In a non-limiting embodiment, the work vehicle 100 operates in multiple modes. In a first operating mode (e.g., "engine off" operating mode), the one or more batteries 212 of the vehicle electrical system 124 may provide a voltage output within a range indicating that the engine 114 is in an "off" state. For example, if the vehicle electrical system includes a single battery, the voltage output in the first operating mode may be less than 13 volts. In other embodiments, the voltage output in the first operating mode may be less than 12 volts, less than 12.5 volts, less than 13.5 volts, or another appropriate value. Furthermore, if the vehicle electrical system includes two batteries in a serial arrangement, the voltage output in the first operating mode may be less than 26 volts. In other embodiments, the voltage output in the first operating mode with two batteries in a serial arrangement may be less than 24 volts, less than 24.5 volts, less than 25 volts, less than 25.5 volts, or another appropriate value. In a second operating mode (e.g., "engine on" operating mode), the one or more batteries 212 of the vehicle electrical system 124 may provide an elevated voltage output within a range indicating that the engine 114 is in a "running" or "on" state, and the engine 114 is charging the one or more batteries 212 via the one or more generators 214. The "engine on" range may be different for the variety of work vehicles, and in some embodiments with a single battery, the range may be greater than or equal to 13 volts. In certain embodiments, the range may be greater than or equal to 13.5 volts, greater than or equal to 14 volts, or another appropriate range. In other embodiments in which the vehicle electrical system includes two batteries in a serial arrangement, the range may be greater than or equal to 26 volts. In certain embodiments, the range may be greater than or equal to 27 volts, greater than or equal to 28 volts, or another appropriate range.

In a non-limiting embodiment, a connected services module 128 is coupled to the work vehicle 100. The connected services module includes a housing 229 configured to house various electrical components included in the connected services module. In certain embodiments, the connected services module 128 includes the mechanical connection interface 130 that is configured to removably attach the housing 229 to the work vehicle 100. As discussed previously, the mechanical connection interface 130 may include but is not limited to one or more types of mechanical connections (e.g. an adhesive interface, a magnetic interface, a fastener interface, etc.).

In a non-limiting embodiment, the connected services module 128 includes a connected services controller 228, a spatial locating device 232, a transceiver 226, a voltage sensor 230, and an interface module 224. In the illustrated embodiment, the connected services controller 228 is an electronic controller having a memory device 220 and a microprocessor 222, and the connected services controller 228 is configured to carry out the functionality of the connected services module explained below. In the illustrated embodiment, the spatial locating device 232 is disposed within the housing 229 of the connected services module 128 and is communicatively coupled to the connected services controller 228. The spatial locating device 232 is configured to output a position signal (e.g., first position signal) indicative of a position, and in certain embodiments, a velocity of the work vehicle 100. The spatial locating device 232 may include any suitable system configured to monitor and/or determine the position of the work vehicle 100, such as a GPS receiver, for example. The connected services controller 228 may be configured to output a position signal (e.g., second position signal) indicative of the position, and in certain embodiments, the velocity of the work vehicle (e.g., at certain intervals, according to a plan, etc.). As discussed in further detail below, in certain embodiments, the connected services module 128 may connect directly to the vehicle electrical system. This direct connection enables the spatial locating device 232 to output a position signal while the work vehicle 100 is operating in the first mode of operation or the second mode of operation.

In a non-limiting embodiment, the work vehicle 100 may operate in multiple working states while in the second mode of operation. For example, the second mode of operation (e.g. "engine on" operating mode) may include a first working state (e.g. "idling" working state) and a second working state (e.g. "moving" working state). The connected services controller 228 may determine whether the work vehicle 100 is in the first working state (e.g., "idling" working state) or the second working state (e.g., "moving" working state) based on ground speed of the work vehicle 100 (e.g., which may be determined based on feedback from the spatial locating device 232). For example, the connected services controller may determine that the work vehicle 100 is in the first working state (e.g., idling" working state) in response to determining the ground speed of the work vehicle is less than 1 kilometer per hour. In other embodiments, the ground speed threshold for the first working state may be less than 0.5 kilometers per hour, less than 1 meter per second, less than 0.5 meters per second, or another appropriate value. The connected services controller may determine that the work vehicle is in the second working state (e.g. "moving" working state) in response to determining the ground speed of the work vehicle is greater than or equal to 1 kilometer per hour. In other embodiments, the speed threshold for the second working state may be greater than or equal to 0.5 kilometers per hour, greater than or equal to 1 meter per second, greater than or equal to 0.5 meters per second, or another appropriate value.

In the illustrated embodiment, the connected services module 128 additionally includes a transceiver 226 communicatively coupled to the connected services controller 228. The transceiver 226 is configured to establish a communication link with a corresponding transceiver 242 of a base station 250, thereby facilitating communication between the connected services controller 228 and the base station 250. The transceivers 226, 242 may operate at any suitable frequency range within the electromagnetic spectrum. For example, in certain embodiments, the transceiver 226 may output and receive radio waves within a frequency of about 1 GHz to about 10 GHz. In addition, the transceivers 226, 242 may utilize any suitable communication protocol, such as a standard protocol (e.g., Wi-Fi, Bluetooth, etc.) or a proprietary protocol. The transceivers may also communicate via a network such as a cellular network.

In a non-limiting embodiment, the voltage sensor 230 and the interface module 224 are disposed within the housing 229 of the connected services module 128. The voltage sensor 230 and the interface module 224 are communicatively coupled to the connected services controller 228. The voltage sensor 230 is configured to monitor the voltage output of the vehicle electrical system 124 and to output a voltage signal indicative of the voltage output to the connected services controller 228. The interface module 224 is configured to communicatively coupled to the CAN bus 125 of the work vehicle 100, to receive data from the CAN bus, and to output the data to the connected services controller 228.

In non-limiting embodiments, a connective cable 218 is included with the connected services module 128, and a first end of the connective cable 218 communicatively couples to the interface module 224 of the connected services module 128. In addition, a second end of the connective cable 218 communicatively couples to the CAN bus 125 (e.g., a CAN bus port). The connective cable 218 enables the interface module 224 to receive data from the CAN bus 125. In certain embodiments, the interface module 224 communicates the received data to the connected services controller 228, and the controller 228 outputs a signal indicative of the data. The data includes at least one of the engine speed, fuel flow rate, battery current, oil temperature, or the engine torque. In certain embodiments, the interface module 224 and the connective cable 218 may be omitted such that the connected services controller does not monitor and output the data from the CAN bus 125.

In addition, the connected services module 128 includes a connective cable 219 having a first end and a second end. The first end is electrically coupled to the voltage sensor 230, and the second end is electrically coupled to the vehicle electrical system 124. The connective cable 218 enables the voltage sensor 230 to receive and monitor the voltage output of the vehicle electrical system 124. In certain embodiments, the connective cable 219 also provides electrical power from the vehicle electrical system 214 to various electrical components of the connected services module 128, such as the connected services controller 128, the spatial locating device 232, the transceiver 226, or a combination thereof. Furthermore, in certain embodiments, the connected services module may include a battery configured to power various electrical components of the connected services module (e.g., alone or in combination with the electrical power provided by the vehicle electrical system). For example, in certain embodiments, the vehicle electrical system may provide electrical power to charge the battery, and the battery may provide electrical power to electrical component(s) of the connected services module at least while the electrical power from the vehicle electrical system is not provided to the electrical component(s). The connective cable 219 enables the connected services module 128 to connect to and communicate with various work vehicles produced by different manufacturers. In certain embodiments, while the connected services module 128 may have the capability to connect to the CAN bus, the connected services module may still couple to the vehicle electrical system 124 and monitor the voltage output.

In a non-limiting embodiment, when the voltage sensor 230 outputs the voltage signal indicative of the voltage output of the electrical system 124 of the work vehicle 100, the connected services controller 228 is configured to receive the voltage signal from the voltage sensor 230. The controller 228 may determine, based on the received voltage signal, whether the work vehicle 100 is operating in the first mode of operation or the second mode of operation. The controller 228 may further determine the run time for the work vehicle 100, with the run time corresponding to a duration that the work vehicle is operating in the second mode of operation. In certain embodiments, determining the run time includes aggregating each duration that the work vehicle 100 is operating in the second mode of operation. In another embodiment, based on this determination of run time of the work vehicle 100, the controller 228 may generate a maintenance schedule for the work vehicle.

In a non-limiting embodiment, the spatial locating device 232 is configured to output a ground speed signal indicative of the ground speed of the work vehicle 100, and the connected services controller 228 is configured to receive the ground speed signal from the spatial locating device 232. Additionally or alternatively, the connected services controller may be configured to determine the ground speed of the work vehicle based on position signals indicative of multiple positions of the work vehicle. The controller 228 may determine (e.g., based on the received signal(s)) whether the work vehicle 100 is operating in the first working state or the second working state. The controller 228 may further determine the total distance traveled by the work vehicle 100, with the total distance corresponding to a distance value (e.g. miles, meters, kilometers) that the work vehicle traveled while operating in the second working state of the second mode of operation. The controller 228 may distinguish between distance traveled by the work vehicle 100 while in the first mode of operation (e.g. engine "off" while being towed, in transit in a shipping container, etc.) and distance traveled by the work vehicle 100 while in the second mode of operation (e.g. engine "on" and moving). In certain embodiments, determining the total distance traveled includes aggregating each unit of distance that the work vehicle travels while in the second working state of the second mode of operation. In certain embodiments, based on the determination of total distance traveled by the work vehicle 100 while in the second working state of the second mode of operation, the controller may generate a maintenance schedule for the work vehicle.

Furthermore, the connected services controller 228 is configured to control the transceiver 226 of the connected services module 128 to output the run time signal, which is indicative of the run time of the work vehicle 100, to the base station 250. The connected services controller 228 may also be configured to control the transceiver 226 to output the total distance traveled signal, which is indicative of the total distance traveled of the work vehicle 100, to the base station 250. In certain embodiments, the transceiver 226 outputs the run time and/or total distance traveled signal at a selected interval (e.g., every minute, hourly, at the end of each work day, or at any other suitable interval). The base station 250 includes a user interface 234 having a display 240 that is configured to present information to an operator, including but not limited to the position of the work vehicle 100, the velocity of the work vehicle 100 (e.g., ground speed of the work vehicle), the work vehicle's CAN bus 125 data, the run time of the work vehicle 100, and the total distance traveled by the work vehicle 100.

The base station 250 includes an electronic controller 236 with a microprocessor 246 and a memory 238. The base station further includes a storage device 248 configured to digitally store the information received by the transceiver 242 and processed by the controller 236, so that the operator may recall the information corresponding to an individual work vehicle 100 when needed at a later time. The transceiver 242 may communicate with and receive data from the transceiver 226 of multiple connected services modules. As illustrated, the user interface 234, the storage device 248, and the transceiver 242 are communicatively coupled to the controller 236. By considering information presented to the operator on the display 240, the operator may, through telemetry software installed on the base station controller 236, generate maintenance schedules for various work vehicles in the fleet. In certain embodiments, the base station 250 may be a handheld device, a laptop, a desktop computer, or another suitable device.

Figure 3:
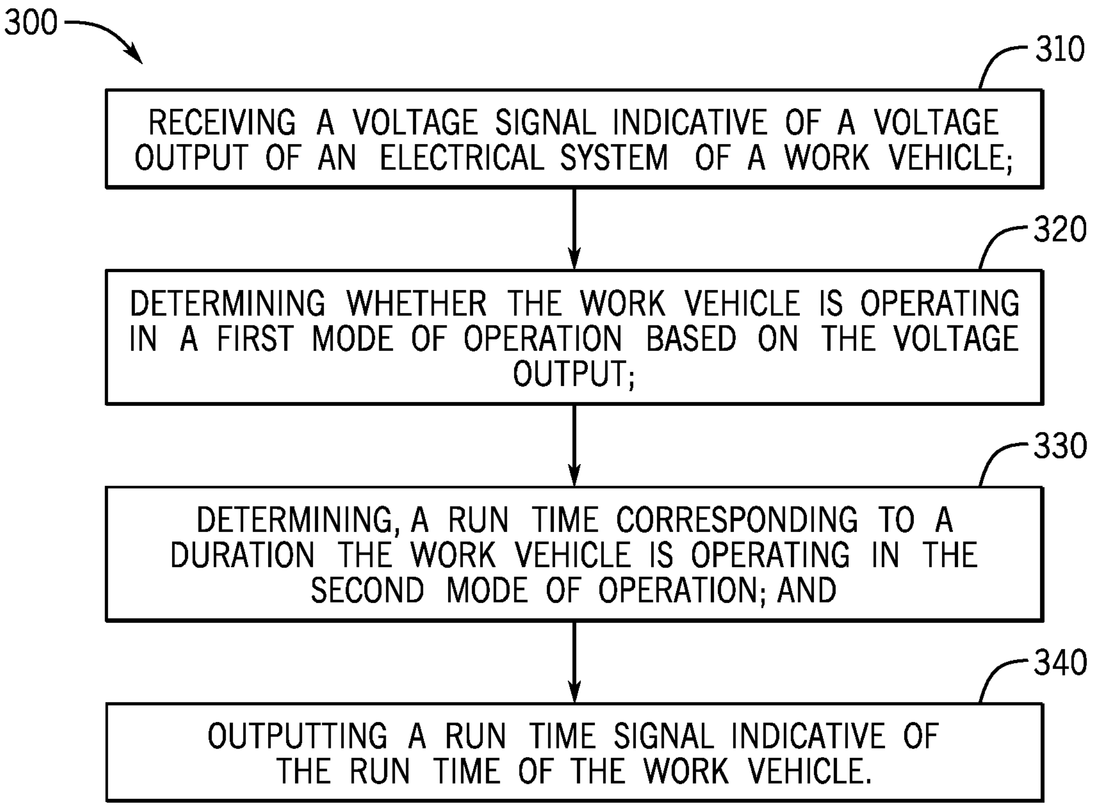
FIG. 3 is a flowchart of an embodiment of a method for determining a run time of a work vehicle using a connected services module, in accordance with aspects of the present disclosure.

FIG. 3 is flowchart of an embodiment of a method 300 for determining the run time of a work vehicle using a connected services module. First, in block 1 of the method 310, a connected services module is configured to receive, via a controller of the connected services module, a voltage signal from a voltage sensor for the connected services module indicative of a voltage output of an electrical system of the work vehicle. In certain embodiments, the voltage sensor may be electrically coupled to the work vehicle's electrical system, the CAN bus, or both by means of a connective cable. In other embodiments, the controller may additionally receive data from the CAN bus and the received data may include engine speed, fuel flow rate, battery current, oil temperature, engine torque, or some combination thereof. In another embodiment, the controller may receive a first position signal from a spatial locating device of the connected services module indicative of the position of the connected services module.

At 320, the connective services controller is configured to determine, based on the voltage output, whether the work vehicle is operating in a first mode of operation or a second mode of operation. In certain embodiments, the first mode of operation corresponds to an "engine off" state of the work vehicle, and in other embodiments, the second mode of operation corresponds to an "engine on" state. In an embodiment, determining whether the work vehicle is operating in the first mode of operation is in response to determining that the voltage output is less than 13 volts. In other embodiments, the voltage output in the first operating mode may be less than 12 volts, less than 12.5 volts, less than 13.5 volts, or another appropriate value. In an embodiment, determining whether the work vehicle is operating in the second mode of operation is in response to determining that the voltage output is greater than or equal to 13 volts. In other embodiments, the voltage output in the second operating mode may be greater than or equal to 13.5 volts, greater than or equal to 14 volts, or another appropriate range.

At 330, the connective services module controller determines a run time corresponding to a duration the work vehicle is operating in the second mode of operation. In a non-limiting embodiment, determining the run time includes aggregating each duration the work vehicle is operating in the second mode of operation. Finally, at 340, the controller of the connected services module outputs a run time signal indicative of the run time of the vehicle. In a non-limiting embodiment, the controller may further analyze the run time signal and generate a maintenance schedule for the work vehicle. In other embodiments, a base station receives the output signals and analysis from the controller, and the base station processes the data and displays it to a base station operator through the user interface. In certain embodiments, from the presented data, the operator may make corresponding maintenance decisions regarding the fleet of work vehicles.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A connected services module, comprising:

a voltage sensor configured to output a voltage signal indicative of a voltage output of an electrical system of a work vehicle, wherein the electrical system comprises a battery configured to provide the voltage output and a generator configured to charge the battery; and a controller communicatively coupled to the voltage sensor, wherein the controller comprises a processor and a memory, and the controller is configured to:

receive the voltage signal from the voltage sensor;

determine whether the work vehicle is operating in a first mode of operation or a second mode of operation based on the voltage output, wherein the first mode of operation corresponds to the voltage output provided by the battery being less than a threshold voltage, wherein the second mode of operation corresponds to the voltage output provided by the battery being equal to or exceeding the threshold voltage, and wherein the generator charges the battery in the second mode of operation;

determine a run time corresponding to a duration the work vehicle is operating in the second mode of operation; and output a run time signal indicative of the run time of the work vehicle;

wherein the connected services module is configured to removably couple to the work vehicle.

2. The connected services module of claim 1, wherein the controller is configured to determine the work vehicle is operating in the first mode of operation in response to determining the voltage output is less than the threshold voltage, and wherein the threshold voltage is 13 volts.

3. The connected services module of claim 2, wherein the controller is configured to determine the work vehicle is operating in the second mode of operation in response to determining the voltage output is greater than or equal to the threshold voltage.

4. The connected services module of claim 1, comprising a spatial locating device communicatively coupled to the controller, wherein the spatial locating device is configured to output a first position signal indicative of a position of the connected services module, and the controller is configured to output a second position signal indicative of the position of the connected services module.

5. The connected services module of claim 1, wherein, in response to the controller determining that the work vehicle is operating in the second mode of operation, the controller is configured to determine whether the work vehicle is operating in an idling working state or a moving working state based on a ground speed of the work vehicle.

6. The connected services module of claim 5, wherein the controller is configured to determine a total distance travelled corresponding to a distance aggregated while the work vehicle is operating in the moving working state of the second mode of operation.

7. The connected services module of claim 1, comprising an interface module communicatively coupled to the controller, wherein the interface module is configured to communicatively couple to a controller area network (CAN) bus of the work vehicle, the interface module is configured to receive data from the CAN bus, the controller is configured to output a data signal indicative of the data, and the data comprises at least one of:

engine speed;

fuel flow rate;

battery current;

oil temperature; or engine torque.

8. A method for determining a run time of a work vehicle via a connected services module removably coupled to the work vehicle, comprising:

receiving, via a controller of the connected services module, a voltage signal from a voltage sensor of the connected services module indicative of a voltage output of an electrical system of the work vehicle, wherein the electrical system comprises a battery configured to provide the voltage output and a generator configured to charge the battery;

determining, via the controller, whether the work vehicle is operating in a first mode of operation or a second mode of operation based on the voltage output, wherein the first mode of operation corresponds to the voltage output provided by the battery being less than a threshold voltage, wherein the second mode of operation corresponds to the voltage output provided by the battery being equal to or exceeding the threshold voltage, and wherein the generator charges the battery in the second mode of operation;

determining, via the controller, the run time corresponding to a duration the work vehicle is operating in the second mode of operation; and outputting, via the controller, a run time signal indicative of the run time of the work vehicle.

9. The method of claim 8, wherein determining whether the work vehicle is operating in the first mode of operation or the second mode of operation comprises determining the work vehicle is operating in the first mode of operation in response to determining the voltage output is less than the threshold voltage, and wherein the threshold voltage is 13 volts.

10. The method of claim 9, wherein determining whether the work vehicle is operating in the first mode of operation or the second mode of operation comprises determining the work vehicle is operating in the second mode of operation in response to determining the voltage output is greater than or equal to the threshold voltage.

11. The method of claim 8, comprising analyzing, via the controller, the run time to generate a maintenance schedule for the work vehicle.

12. The method of claim 8, wherein determining the run time comprises aggregating each duration the work vehicle is operating in the second mode of operation.

13. The method of claim 8, comprising:

receiving, via the controller, a first position signal from a spatial locating device of the connected services module indicative of a position of the connected services module; and outputting, via the controller, a second position signal indicative of the position of the connected services module.

14. The method of claim 8, comprising:

receiving, via the controller, data from a controller area network (CAN) bus; and outputting, via the controller, a data signal indicative of the data;

wherein the data comprises at least one of:

engine speed;

fuel flow rate;

battery current;

oil temperature; or engine torque.

15. A connected services module, comprising:

a housing configured to removably couple to a work vehicle;

a voltage sensor disposed within the housing, wherein the voltage sensor is configured to output a voltage signal indicative of a voltage output of an electrical system of the work vehicle, wherein the electrical system comprises a battery configured to provide the voltage output and a generator configured to charge the battery;

a connective cable comprising a first end and a second end, wherein the first end is electrically coupled to the voltage sensor, and the second end is configured to electrically couple to the electrical system;

a transceiver; and a controller disposed within the housing and communicatively coupled to the voltage sensor and to the transceiver, wherein the controller comprises a memory and a processor, and the controller is configured to:

receive the voltage signal from the voltage sensor;

determine whether the work vehicle is operating in a first mode of operation or a second mode of operation based on the voltage output, wherein the first mode of operation corresponds to the voltage output provided by the battery being less than a threshold voltage, wherein the second mode of operation corresponds to the voltage output provided by the battery being equal to or exceeding the threshold voltage, and wherein the generator charges the battery in the second mode of operation;

determine a run time corresponding to a duration the work vehicle is operating in the second mode of operation; and control the transceiver to output a run time signal indicative of the run time of the work vehicle.

16. The connected services module of claim 15, comprising an interface module communicatively coupled to the controller, wherein the interface module is configured to communicatively couple to a controller area network (CAN) bus of the work vehicle, the interface module is configured to receive data from the CAN bus, the controller is configured to output a data signal indicative of the data, and data comprises at least one of:

engine speed;

fuel flow rate;

battery current;

oil temperature; or engine torque.

17. The connected services module of claim 15, comprising a spatial locating device communicatively coupled to the controller, wherein the spatial locating device is configured to output a first position signal indicative of a position of the connected services module, and the controller is configured to output a second position signal indicative of the position of the connected services module.

18. The connected services module of claim 15, wherein the connected services module is electrically powered by the electrical system.

19. The connected services module of claim 15, comprising:

an adhesive interface configured to removably couple the housing to the work vehicle;

a magnetic interface configured to removably couple the housing to the work vehicle; or a combination thereof.

20. The connected services module of claim 15, wherein determining the run time comprises aggregating each duration the work vehicle is operating in the second mode of operation.

* * * * *